Dec. 6, 1966       A. V. LATTIMER       3,290,458
DEVICE FOR PREVENTING THEFT OF MOTOR VEHICLES
Filed Feb. 8, 1965
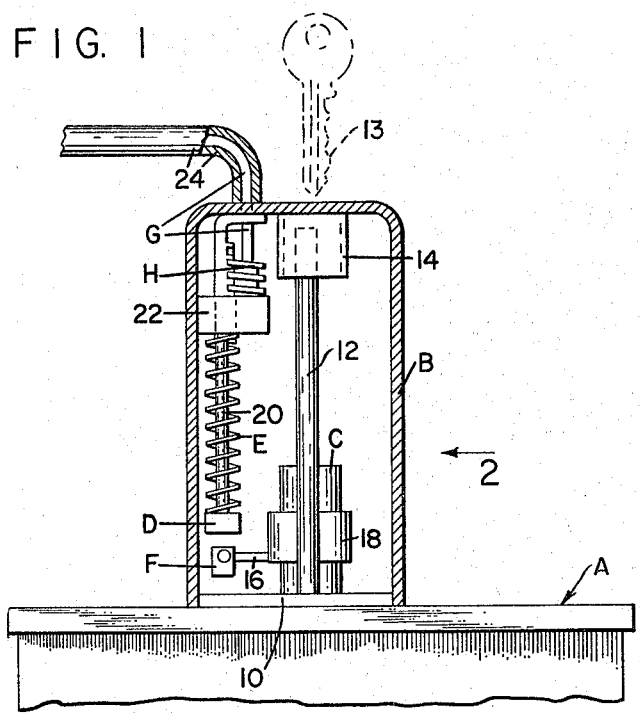
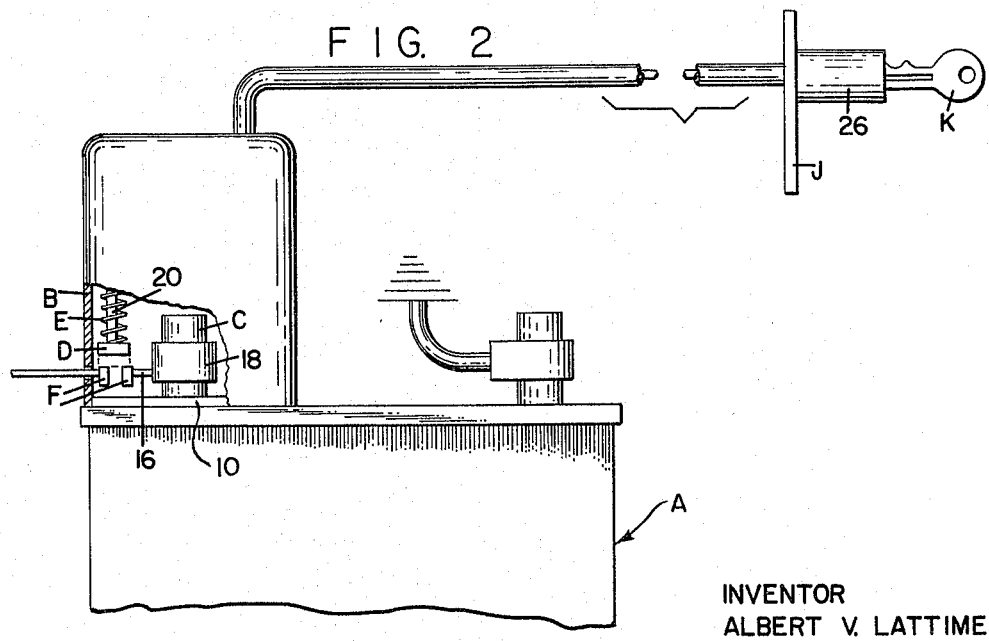
INVENTOR
ALBERT V. LATTIMER
BY *Charles R. Fay*
ATTORNEY

[Patent №] 3,290,458
Patented Dec. 6, 1966

3,290,458
DEVICE FOR PREVENTING THEFT OF MOTOR VEHICLES
Albert V. Lattimer, 76 Chester St., Worcester, Mass.
Filed Feb. 8, 1965, Ser. No. 430,838
4 Claims. (Cl. 200—44)

This invention relates to a new and improved device for preventing theft of motor vehicles by short-circuiting the ignition key or by connecting the positive pole of the battery across the starter. The principal object of the present invention resides in the provision of a protective housing which completely covers one of the poles of the battery as for instance the positive pole and renders it impossible for access to be made to this pole, in combination with key-operated means mounted on the dashboard or in some convenient but remote location from the battery by which circuit opening means, completely enclosed and concealed in the housing, is operated, so that merely by turning a key the circuit is opened and cannot be closed until the key is once more used to return the parts to operative position.

The invention also contemplates the provision of a circuit interrupter operated by key means located at the dashboard or other convenient location which cannot be closed in any other way than by means of the key.

Other objects and advantages of the invention will appear hereinafter.

Reference is to be had to the accompanying drawings in which:

FIG. 1 is a view in elevation and partly in section illustrating the device diagrammatically, and FIG. 2 is a view in side elevation looking in the direction of arrow 2 in FIG. 1.

In illustrating the invention, the reference numeral A illustrates a conventional vehicle battery, B is a theftproof box, C is the positive pole of the battery, D is a switch or the like, E illustrates a light spring which maintains the switch D in position to bridge the two spaced contacts F, F, and G is a cable for operating a worm or the like H by which means the bridging switch D is mechanically raised from the dashboard J as by means of a key K. In general the operation of this device is that one of the contacts F is connected to the post C at all times but this is concealed within the box B which is theftproof and can only be broken by a good deal of effort. The other contact F leads to the various devices to be operated by electricity in the vehicle and of course when the bridging contact at D is raised against the action of spring E by the worm H, which in turn is under the influence of cable G, the battery is completely immobilized and short-circuiting of the ignition wires, etc. would be to no avail.

The box or enclosure B can be of any construction desired but it is preferably only so large as to accommodate the necessary parts and it is very strong so that it is not easily broken. It is permanently mounted on the battery by any desired means, but the battery may be provided with a fixed bottom member 10 having a fixed post 12 which is latched or unlatched by a key 13 acting with a lock 14 fixed to the box. Otherwise the housing B is unitary and it will be seen that the parts cannot be got at except by the use of the key for the lock 14. If the box B were to be broken from the battery A as by means of a hammer or the like, it is possible that the post C would then be made available to the car thief but this would be so much trouble and cause so much commotion as to be generally impractical and the vehicle thief would turn his attention elsewhere.

The contacts F, F are mounted in any way desired and that one which is attached to the post may be secured to it in any way as by a cable 16 which is provided with a battery post terminal 18 of conventional design.

The bridging contact D is mounted on the end of a post 20 which is movable vertically in a guide 22 when the worm at H is turned, the worm H being held in fixed position insofar as axial motion is concerned but being capable of rotation under influence of cable G. Being in mesh with teeth on the post 20, it will be seen that this will cause the bridging member D to be raised against the action of spring E. The spring E will normally be a relatively weak spring and is not always necessary where the battery is held in upright position as is shown herein.

The cable G is mounted in a flexible armored sheath 24 so that it is not easily cut and normally the cable G will be damaged to such an extent by bolt cutters that it would not be rotatable sufficiently to work the worm H if the sheath were to be disrupted.

The key K is adapted to unlock a conventional tumbler lock at 26 which is mounted directly on the dashboard and the key K can either to used to merely unlock this member so that the cable can be rotated or it can itself be used to rotate the cable to a sufficient degree to interrupt the circuit by raising the bridge contact D a sufficient amount.

It will be appreciated that when the cable G is rotated in the right direction and the worm H is turned, the worm is of such a nature as to maintain the post 20 and bridging contact D in raised position interrupting the circuit and this is true whether the post B is mounted vertically as shown or in any position at angles with respect thereto or even upside down, in which case of course the spring would assist the return motion of post and bridging contact to circuit closing position thereof.

Having thus described my invention and the advantages thereof, I do not wish to be limited to the details herein disclosed, otherwise than as set forth in the claims, but what I claim is:

1. A device for preventing theft of motor vehicles having electric batteries for energizing the vehicle starter, comprising an enclosure, means mounting the enclosure on the battery in a position to completely cover and conceal a post of the battery, an electrical connection within the enclosure for the concealed post, a second connection passing through a wall of the enclosure to the starter of the vehicle, means forming a gap between the two electrical connections, movable means to bridge the gap to close the circuit, mechanical means to move said gap bridging means to a position to interrupt the current passing between said two electric connections, flexible means to operate said mechanical means, said flexible means extending through a wall of said enclosure to a remote point, a key operated lock at said remote point for said flexible means to selectively prevent or allow turning thereof to operate said mechanical means, and means completely covering and protecting said flexible means.

2. The device of claim 1 wherein said mechanical means comprises a worm and a movable post mounting the bridging means, and corresponding teeth on the post engaged with said worm for motion of the post by the worm.

3. A device for preventing theft of a motor vehicle having a conventional vehicle battery comprising an enclosure adapted to be mounted on the battery in such a position as to completely cover and conceal a terminal thereof, key operated means on the enclosure for locking it to the battery, an electrical connection for the post within the enclosure, said electrical connection having a gap therein, two electric contacts in spaced relationship with respect to each other forming said gap, said electric connection proceeding through the enclosure, a bridging contact for connecting said contacts, a post mounting said bridging contact for rectilinear motion toward and from said contacts, teeth on said post, a gear engaged with the teeth, said gear being held against longitudinal motion but being rotatable, means for rotating the gear to move the post and thereby the bridging contact, said last-named means comprising a flexible cable extending to a remote point on the vheicle, and key operated means for preventing the operation of said cable.

4. The device of claim 3 including a spring normally urging the bridging contact to contact-connecting condition.

References Cited by the Examiner

UNITED STATES PATENTS

| | | | |
|---|---|---|---|
| 2,786,921 | 3/1957 | List | 200—161 |
| 2,813,939 | 11/1957 | Brutscher et al. | 200—44 |
| 2,853,627 | 9/1958 | Karl | 200—161 X |

ROBERT K. SCHAEFER, *Primary Examiner.*

H. HOHAUSER, *Assistant Examiner.*